(12) United States Patent
Cayton et al.

(10) Patent No.: US 7,103,888 B1
(45) Date of Patent: Sep. 5, 2006

(54) SPLIT MODEL DRIVER USING A PUSH-PUSH MESSAGING PROTOCOL OVER A CHANNEL BASED NETWORK

(75) Inventors: Phil C. Cayton, Hillsboro, OR (US); Harinarayanan Seshadri, Beaverton, OR (US); Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 09/588,006

(22) Filed: Jun. 6, 2000

(51) Int. Cl.
G06F 9/46 (2006.01)

(52) U.S. Cl. ............... 719/313; 709/213; 711/147; 711/148; 711/149; 710/20; 710/21; 710/22

(58) Field of Classification Search ............ 709/213; 711/147–149; 710/1–74; 719/312–315
See application file for complete search history.

(56) References Cited

U.S. PATENT DOCUMENTS

| | | | | |
|---|---|---|---|---|
| 4,503,499 A | * | 3/1985 | Mason et al. | 709/101 |
| 4,674,033 A | * | 6/1987 | Miller | 711/151 |
| 6,370,605 B1 | * | 4/2002 | Chong, Jr. | 710/131 |
| 6,545,981 B1 | * | 4/2003 | Garcia et al. | 370/242 |
| 6,591,310 B1 | * | 7/2003 | Johnson | 710/3 |

* cited by examiner

*Primary Examiner*—Meng-Al T. An
*Assistant Examiner*—Charles E. Anya
(74) *Attorney, Agent, or Firm*—Kacvinsky LLC (57) ABSTRACT

A channel based network is provided that allows one or more hosts to communicate with one or more remote fabric attached I/O units. A split-model network driver includes a host module driver and I/O unit module driver. The host module driver and the I/O unit module driver each includes a messaging layer that allows the hosts and I/O units to communicate over the switched fabric using a push-push messaging protocol. For a host to send data, the host either initiates a RDMA write to a pre-registered buffer or initiates a message Send to a pre-posted buffer on the target. For the RDMA case, the initiator would have to send the target some form of transfer indication specifying where the data has been written. This notification can be done with either a separate message or more preferably with immediate data that is included with the RDMA write.

20 Claims, 9 Drawing Sheets

FIG. 1A

VI ARCHITECTURAL MODEL

SPLIT MODEL DRIVER USING A PUSH-PUSH MESSAGING PROTOCOL OVER A CHANNEL BASED NETWORK

FIELD

The invention generally relates to computers and computer networks and in particular to a split model driver using a push-push messaging protocol.

BACKGROUND

Current input/output (I/O) technology for computer systems provide for a single I/O device driver program controlling an I/O device, with that I/O device driver executing as a component of operating system (OS) software solely within the OS environment on a host system. Such a single or monolithic I/O device driver is provided on the host computer to allow access to the local I/O device or controller. Such a conventional arrangement is not very flexible.

Moreover, such an arrangement requires an inefficient communications process to allow one host to communicate with an I/O device on another host. The OS directly controls I/O operations between the I/O device and its physical memory. If another host wants access to the I/O device, it must request service from the OS on the host system owning the I/O device. In a simple single I/O unit or single host system operating environments this is sufficient, but in clustered environments several data movements or messages may be required to complete a requested data transfer.

Several communications models are presently used for either a distributed environment or in single host systems. In Pull-Pull models, entities request data from other entities and provide a known location for that data to be placed in. Examples of network applications that use the pull/pull model include FTP (File Transfer Protocol and HTTP (Hypertext Transfer Protocol). The disadvantages of this model include heavy data transfer latency, and the inability for entities to know when data has been updated. These limitations (and others) have led to a lack of Pull-Pull models in system architectures.

In Push-Pull Models, one entity (typically the faster entity) will push data to and pull data from the target entity (typically a slower entity). Advantages of this approach include the ability to use combinations of faster (server) and slower (I/O devices) entities to perform efficient data transfer. A disadvantage is the heavy latency incurred between the request for data and the receipt of that data. Push-Pull models are also used in networking applications such as IP-multicasting and webcasting. Traditional Shared Memory Architectures (e.g., Peripheral Component Interconnect or PCI in a single host environment) favor a Push-Pull model for most of data transfers.

While the current models are designed for the existing shared memory systems, to take advantage of the channel based systems where the host and IO unit are distributed, there is a need for improved techniques to perform communication between computers or nodes in a clustered environment.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention is limited only by the terms of the appended claims.

The following represents brief descriptions of the drawings, wherein.

DETAILED DESCRIPTION

I. Introduction

A channel based network, which may be based upon the VI architecture (for example), is provided that allows one or more hosts to communicate with one or more remote fabric attached I/O units over a switched fabric. To accommodate the distributed nature of the channel based network, a standard network driver is split into two modules including a host module driver and I/O unit module driver. The host module driver and the I/O unit module driver communicate with each other over the switched fabric through a messaging layer. The messaging layer implements the type of data transfer model (e.g., Push-Push, Pull-Pull or Push-Push). According to an example embodiment, the messaging layer is advantageously implemented as a Push-Push messaging protocol for the data transfer in order to reduce latency.

For a host to send a packet to a target or destination using the push-push messaging protocol, the host either initiates a RDMA write to a pre-registered buffer or initiates a message Send to a pre-posted buffer on the target. For the RDMA case, the initiator would have to send the target some form of transfer indication specifying where the data has been written (e.g., indicating which buffers at the destination were consumed or used to store the data). This notification can be done with either a separate message or more preferably with immediate data that is included with the RDMA write. The same model can be used for an I/O unit initiated data transfer. Providing the transfer indication within the RDMA write improves speed of the operation and decreases traffic across the network.

II. The VI Architecture

One technology supporting an example embodiment the invention is the Virtual Interface (VI) Architecture. Several legacy transports have been used as standards for many years. The centralized in-kernel protocol processing for data transfers performed by legacy transports, such as the Transmission Control Protocol/Internet Protocol (TCP/IP) prohibits applications from realizing the potential raw hardware performance offered by underlying high-speed networks. The VI Architecture is proposed as an interface between high performance network hardware and computer systems, and is described in Virtual Interface (VI) Architecture Specification, Version 1.0, Dec. 16, 1997, jointly authored by Compaq Corp., Intel Corp. and Microsoft Corp. The VI Architecture was designed to eliminate the buffer copies and kernel overhead for communications associated with such legacy transports that have caused traditional networked applications to be performance bottlenecks in the past.

Figure 1A:
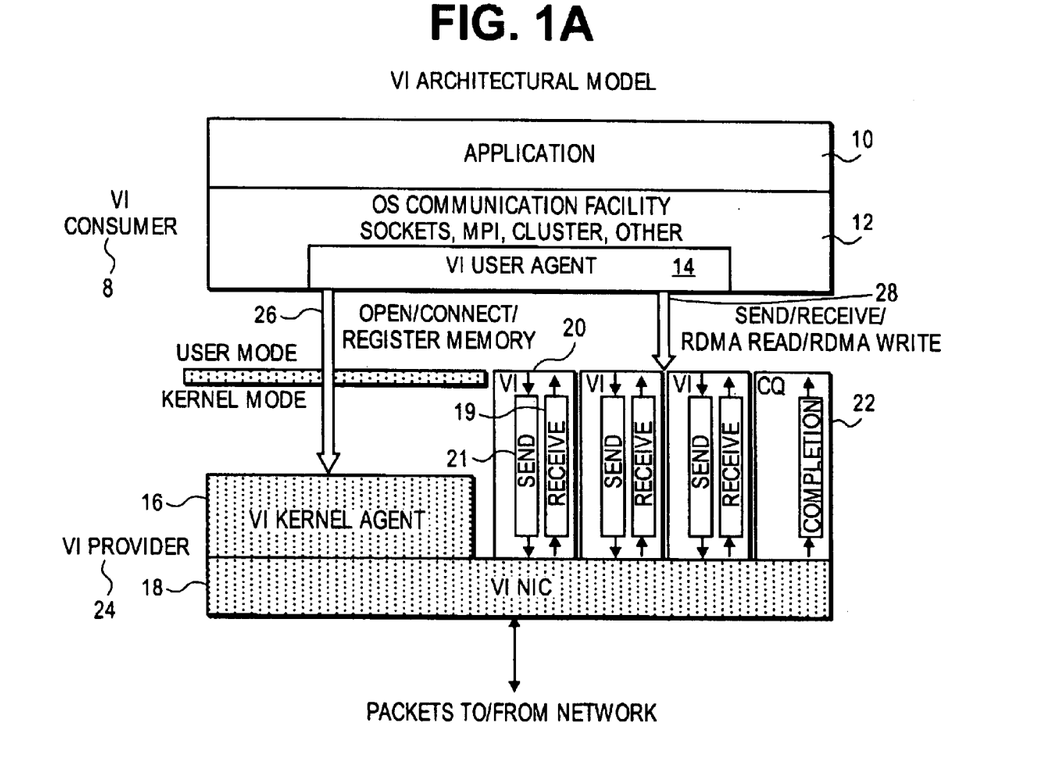
FIG. 1A is a block diagram illustrating a Virtual Interface (VI) architectural model.

FIG. 1A is a block diagram illustrating the VI Architectural model. The VI architecture is a user-level networking architecture designed to achieve low latency, high bandwidth communication within a cluster. VI architecture avoids intermediate data copies and bypasses the operating system to achieve low latency, high bandwidth data transfers.

As shown in FIG. 1A, the VI architectural model includes a VI consumer 8 and a VI provider 24. A VI consumer 8 is a software process that communicates using a Virtual Interface (VI). The VI consumer 8 typically includes an application program 10, an operating system communications facility 12 (e.g., Sockets) and a VI user agent 14. The VI provider 24 includes the combination of a VI network interface controller (VI NIC) 18 and a VI kernel agent 16.

Figure 1B:
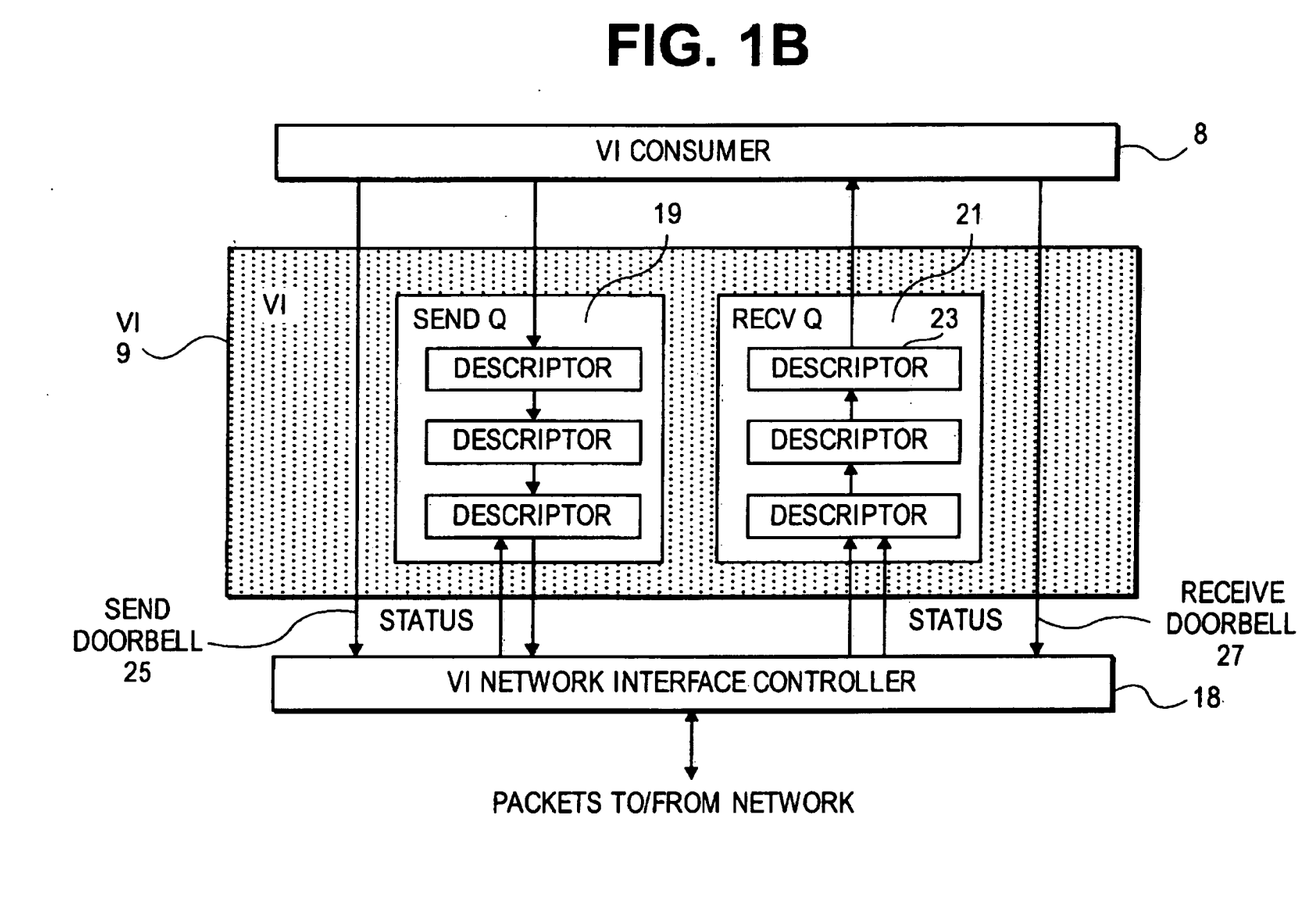
FIG. 1B is a block diagram illustrating a Virtual Interface.

A block diagram illustrating a virtual interface (VI) is illustrated in FIG. 1B. Referring to FIGS. 1A and 1B, a virtual interface (VI) 9 is an interface between a VI NIC 18 and a process or application (a VI consumer 8). The VI 9 allows a VI NIC 18 to directly access the process' (or application's) memory for data transfer operations between the application and the network (i.e., data transfers directly between the application memory and the network without passing through the operating system). The VI 9 includes a pair of work queues, one for send operations (a send queue 21) and one for receive operations (receive queue 19). The work queues store one or more descriptors 23 between the time it is Posted (placed in the queue) and the time it is Done (when the VI NIC has completed processing it). The descriptor 23 is a data structure recognizable by the VI NIC that describes a data movement request, and it includes a list of segments (a control segment, an optional address segment and one or more data segments). The control segment identifies the type of VI NIC data movement operation to be performed (e.g., send, receive) and the status of a completed NIC data movement operation. The data segment describes (or provides an address) of an application data buffer for a VI NIC data movement operation. A receive queue 19 contains descriptors that describe where to place incoming data. A send queue 21 contains descriptors that describe the data to be transmitted. A pair of VIs can be associated using connection primitives to allow packets sent at one VI to be received at the other VI. A send doorbell 25 and a receive doorbell 27 are provided for allowing the VI consumer to notify the VI NIC 18 that work (a descriptor describing a requested data transfer operation) has been placed in the send queue 19 and receive queue 21, respectively.

Referring to FIG. 1A again, the VI user agent 14 is a software component that enables an operating system communication facility 12 to use a particular VI provider 24. The VI user agent 14 abstracts the details of the underlying VI NIC hardware in accordance with an interface defined by an operating system communication facility 12. The VI user agent includes a library of primitives that provide functions for creating a VI, for destroying a VI, for connecting one VI to another, to post descriptors (to place a descriptor in a work queue), etc.

The kernel agent 16 is the privileged part of the operating system, usually a driver supplied by the VI NIC vendor, that performs the setup and resource management functions needed to maintain a virtual interface between VI consumers and VI NICs. These functions include the creation/destruction of VIs, VI connection setup/teardown, interrupt management, management of system memory used by the VI NIC and error handling. VI consumers access the kernel agent 16 using the standard operating system mechanisms such as system calls. As shown by arrow 26 (FIG. 1A), the OS communication facility 12 makes system calls to the VI kernel agent 16 to perform several control operations, including to create a VI on the local system, to connect the local VI to a VI on a remote system (if connection-oriented transfer is desired), and to register application memory. Memory registration enables the VI provider (or VI NIC) to transfer data directly between the registered buffers of a VI consumer and the network (without passing through the OS kernel). Traditional network transports often copy data between user buffers and one or more intermediate kernel buffers. Thus, processing overhead is decreased in the VI architecture because data transfers are performed by the NIC by moving data directly between the registered application buffers and the network without making intermediate kernel copies and without making system calls to the OS kernel.

After creating a VI on the local system of host, connecting the local VI to a remote VI (if a connection oriented data transfer is desired), and registering memory, application 10 or operating system communication facility 12 can use data transfer primitives of VI user agent 14 to send and receive data. The VI architecture defines two types of data transfer operations: 1) traditional send/receive operations; and 2) Remote DMA (RDMA) read/write operations. Once a connection is established (if a connection is desired), the OS communication facility can post the application's send and receive requests directly to the local VI (to the send and receive queues). A consumer 8 posts descriptors (e.g., places descriptors in a work queue) then rings a doorbell to notify the NIC that work has been placed in the work queue. The VI NIC 18 then processes the descriptor by sending or receiving data (directly between application memory and network without kernel processing), and may then notify the VI consumer 8 of the completed work using the completion queue 22. VI architecture does not provide for transport level services, including segmentation and reassembly, flow control, buffer management, etc., nor does VI specify many of the details for performing the data transfers.

III. An Example Channel Based Network

Figure 2:
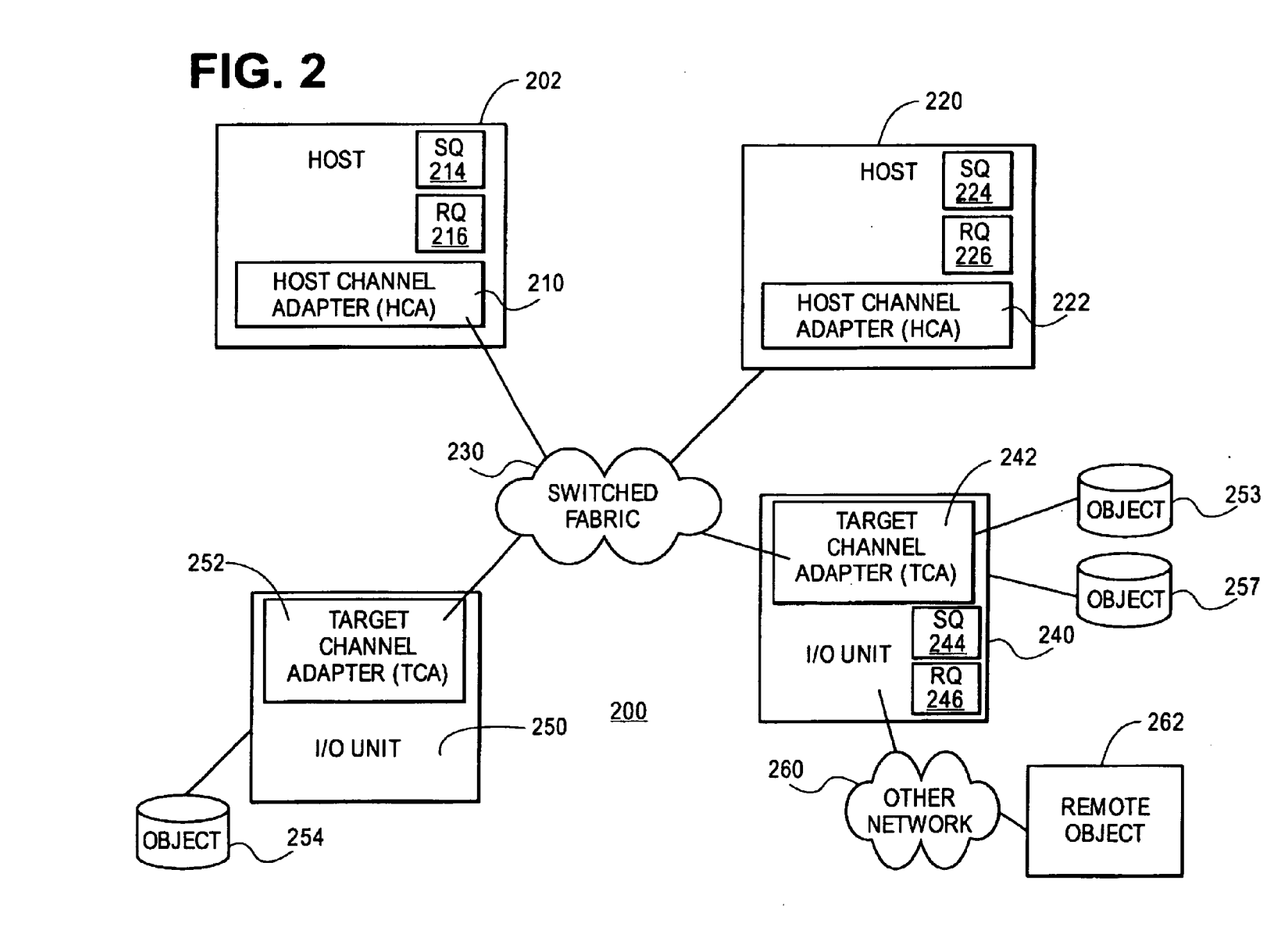
FIG. 2 is a block diagram illustrating an example channel based network according to an example embodiment.

FIG. 2 is a block diagram illustrating an example channel based network according to an example embodiment of the present invention. According to an example embodiment, the channel based network 200 allows one or more hosts or other computing devices to communicate with one or more remote fabric attached I/O units. According to an embodiment, the channel based network 200 includes one or more hosts including host 202 and host 220, and one or more input/output (I/O) units including I/O units 240 and 250. The hosts and I/O units are coupled together over a switched fabric 230. The switched fabric 230 includes one or more switches.

According to an embodiment of the invention, the channel based network 200 (FIG. 2) is based upon or similar to the Virtual Interface (VI) Architecture. As such, the channel based network 200 includes many of the features and advantages of the VI architecture. According to an embodiment of the channel based network 200, a pair of work queues (i.e., a send queue and a receive queue) are preferably provided at each node of the channel based network 200. The work queues allow for direct data transfers between the node's registered memory regions (or buffers) and the network without system calls to the OS kernel and without making kernel buffer copies, as described above regarding the VI architecture. Memory regions/buffers can include volatile and nonvolatile memory, storage devices, I/O devices, network attached devices, etc.

An I/O unit is a node attached to the switched fabric 230 that services I/O requests, and may have one or more I/O devices attached thereto (e.g., including storage devices, network devices, I/O devices). A host is a computer, a server, or other computing device on which a variety of software or programs may run, including an operating system (OS), OS communications facilities, application programs, etc. One or more programs running or executing on a host (such as a device driver or application program) may initiate a request for I/O services, which will be serviced by an I/O node.

Each host or I/O unit includes a channel adapter for interfacing to the switched fabric 230. A channel adapter includes the logic and/or control that allows nodes to communicate with each other over a channel (or over the switched fabric 230 within the channel based network 200). Each channel adapter includes one or more ports, with each port typically having a unique address (e.g., a unique media access control address or MAC address).

According to an embodiment, there may be two types of channel adapters. A host includes a host channel adapter (HCA) for interfacing the host to the fabric 230, while an I/O unit includes a target channel adapter (TCA) for interfacing the I/O unit to the fabric 230. As shown in FIG. 2, host 202 includes a HCA 210 and host 220 includes a HCA 222. I/O unit 240 includes a TCA 242 while I/O unit 250 includes a TCA 252. Another network 260 is connected to I/O unit 240 and which may be for example a Local Area Network (LAN), a Wide Area Network (WAN) or other type of network. A remote object 262, which may be a controller an I/O device, a storage device, etc., is also connected to network 260. Objects 253 and 257 are connected to I/O unit 240 and may also be, for example, a controller an I/O device, a storage device, etc., or other device. Likewise, object 254 is connected to I/O unit 250. Hosts 202 and 220 may access objects 253, 257 and/or 254 over the switched fabric 230 via one of the I/O units.

Each host and I/O unit includes a work queue pair (or a virtual interface) including both a send queue and a receive queue for posting descriptors for the purpose of sending and receiving data, respectively, over the switched fabric 230. For example, host 222 includes a send queue 214 and a receive queue 216 while host 220 includes a send queue 224 and a receive queue 226. Likewise I/O unit 240 includes a send queue 244 and a receive queue 246. I/O unit 250 also includes a send queue and a receive queue (not shown).

Figure 3:
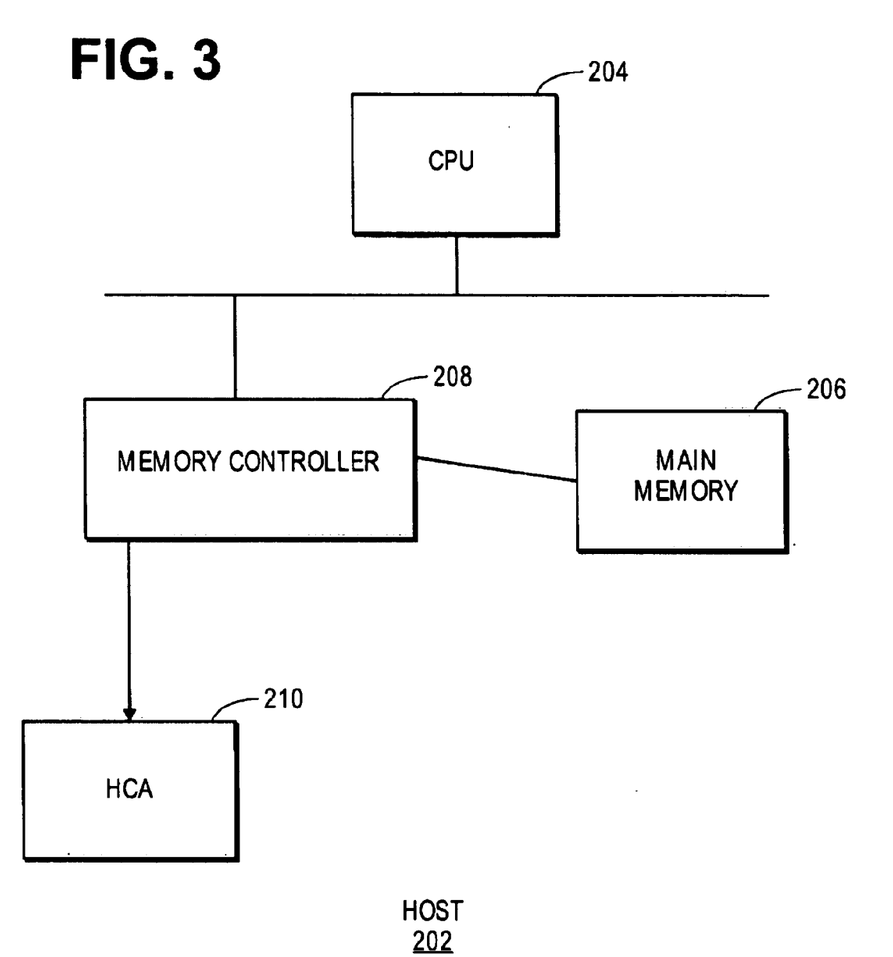
FIG. 3 is A block diagram illustrating a block diagram illustrating a hardware configuration of an example host according to an example embodiment.

FIG. 3 is A block diagram illustrating a block diagram of a hardware configuration of an example host according to an example embodiment. Host 202 (as an example host) may include, for example, a processor (or CPU) 204, memory 206 (such as Dynamic Random Access Memory or DRAM) and a memory controller 208, a computer display, pointing devices (e.g., mouse and keyboard) and other components typically provided as part of a computer or server.

Figure 4:
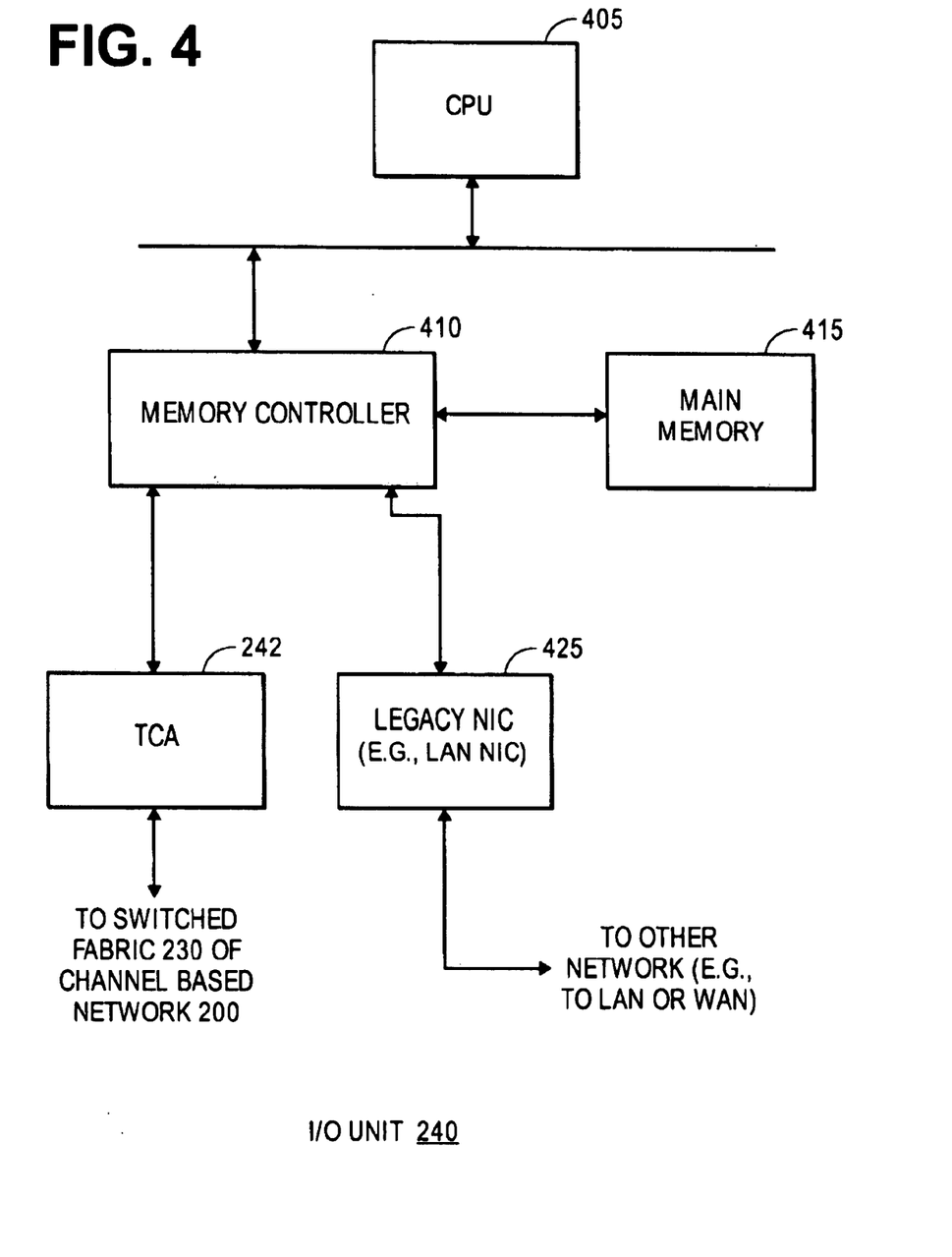
FIG. 4 is a block diagram illustrating an example hardware configuration of an I/O unit according to an example embodiment.

FIG. 4 is a block diagram illustrating an example hardware configuration of an I/O unit according to an example embodiment. The I/O unit includes a CPU (or processor) 405, a memory controller 410, a main memory 415 (such as DRAM), a target channel adapter (TCA) 242 and a legacy network interface controller (NIC) 425. The TCA 242 of I/O unit 240 is connected to the switched fabric 230. The legacy NIC 425 is connected to another network 260 which may be a LAN or WAN or other type of network.

According to an embodiment, one or more applications and other programs (application programs, operating system, I/O device drivers, etc.) running on a host or an I/O unit may operate as a VI consumer, while each connected channel adapter (i.e., HCA or TCA) may operate as a VI NIC 18 (see FIG. 1A).

According to one embodiment, the term "channel based network" may refer to a network in which data transfers are performed directly between registered buffers or memory regions (e.g., registered application buffers) and the network without making kernel buffer copies, similar to the VI architecture. (An additional copy of the data may also be made at the NIC level or by the channel adapter).

Therefore, according to an embodiment, hosts and I/O units each may include a work queue pair, including a send queue and a receive queue (as described above for VI). These queues may take many different forms. According to an example embodiment, the host node (e.g., host application program or host driver) places descriptors into send queues for a send operation (or into receive queues for a receive operation), and then rings a doorbell to notify the HCA that work has been placed in the work queues. The HCA then sends or receives the data over a channel. For example, for a send operation, the HCA generates one or more packets containing the data from the host's registered buffer(s) described by the descriptor as a payload. The one or more packets are then sent over the channel (e.g., over the network 200, including over the switched fabric 230) to the destination node and destination work queue pair.

The behavior of a channel depends on two attributes, the acknowledge and connection attributes. If the acknowledge attribute is set, then a descriptor is not completed until an acknowledgement is returned. If this acknowledge attribute is not set, then the no acknowledgement is sent and the descriptor is completed when the packet is sent onto the wire or transmission media of switched fabric 230. When the connected attribute for a channel is set (i.e., a connected or connection-oriented channel), the two work queue (e.g., a queue pair at the host and a queue pair at the I/O unit) are bound together or associated at either end of the channel. Therefore, all data sent from one send queue is directed to the connected receive queue. If the connected attribute is not set (meaning a connectionless data transfer or connectionless channel), then communicating work queue pairs are not bound together, and a node can send/receive packets to/from any work queue pair. In such case, because the two ends of the channel are not bound together, the descriptor that is posted for the data transfer (e.g., for a Send) is typically required to include a field that specifies the destination (e.g., MAC address and work queue pair number of destination).

A work queue pair sends and receives data from another work queue pair over a channel. Each channel is bidirectional and can send and receive packets. If data to be sent in a packet is too large, the packet will be segmented into multiple cells (segmentation and reassembly performed by channel adapters and typically only for connection oriented channels). According to one embodiment, only single cell packets can be sent in a connectionless channel. Also, segmentation and reassembly is typically not provided by the channel adapter for connectionless channels when a packet exceeds a predetermined size.

IV. A Split Model Driver Using A Push-Push Messaging Protocol

A channel based network 200 is described above. In the channel based network 200, a host's I/O units or devices are not limited to those I/O units which share the same operating system (OS) as the host. Rather, in the channel based network 200, each fabric attached I/O unit can be a separate node on the network 200 and may have a unique network address (e.g., MAC address). Each I/O unit (and including its one or more attached I/O devices or objects) can also be owned or shared by one or more hosts residing on the channel based network 200.

A standard network driver is typically provided on a host computer as a single or monolithic driver because the NIC resides on the same computer system as the host OS. However a monolithic driver would not be applicable for hosts in a channel based network (such as network 200) because of its distributed nature where the I/O units or I/O devices are provided as remote fabric attached devices (remote from the one or more hosts on the channel based network 200). Therefore, according to an embodiment, to accommodate the distributed architecture of the channel based network 200 (where I/O units and hosts are distributed), a standard network driver is split into two modules including a host module driver and an I/O unit module driver.

Figure 5:
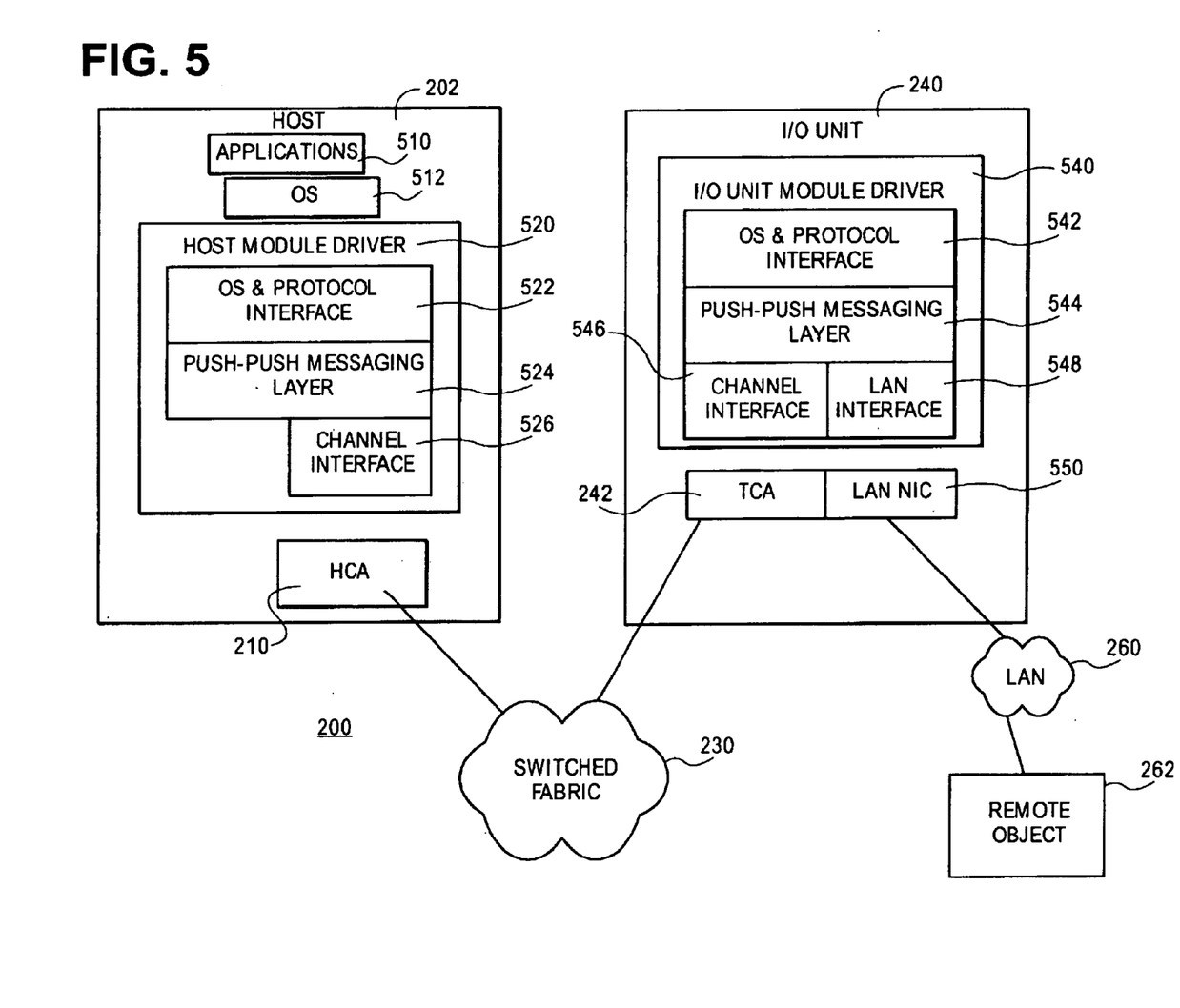
FIG. 5 is a block diagram illustrating example driver modules for a host and I/O unit according to an example embodiment.

FIG. 5 is a block diagram illustrating example driver modules for a host and I/O unit according to an example embodiment. A host 202 and an I/O unit 240 are connected to a switched fabric 230. I/O unit 240 is also connected to a Local Area Network (LAN) 260 via a LAN network interface controller (NIC) 550. A remote object 262 is connected to the LAN 260 and may be accessed or controlled by host 202 through I/O unit 240. LAN 260 and object 262 are not part of the channel based network 200, but are part of a separate legacy network that is connected to I/O unit 240.

Referring to FIG. 5, host 202 includes one or more application programs 510 and an operating system 512. The applications 510 and/or a portion of the operating system 512 may request to send or receive data to/from a remote I/O unit or host, or to a remote object (such as object 262). Host 202 also includes a host module driver 520 for interfacing the local or native OS to the HCA or the switched fabric 230. Host module driver 520 includes an OS and Protocol Interface 522 for interfacing the operating system (OS) 512 and the upper layers of software to the lower layers (including a push-push messaging layer 524).

A push-push messaging layer 524 provides a set of communication services including configuration of channels and connections, connection management and message passing (e.g., for Send operations) and Remote Direct Memory Access (RDMA) operations (described in greater detail below) and message flow control. Push-push messaging layer 524 provides a set of services to the upper layers which abstracts the details of the work queues, descriptors and other details by which data or messages are sent or transferred over the switched fabric 230 to and from other nodes (such as to/from I/O unit 240). The host 202 and the I/O unit 240 communicate and interact through the push-push-messaging layer. Channel interface 526 interfaces host module driver 520 to the host channel adapter (HCA) 210.

HCA 210 interfaces the host to the switched fabric 230. HCA 210 adds a MAC header and CRC (cyclic redundancy check) to a payload to generate a cell that is then transmitted or sent over the switched fabric 230 to I/O unit 240 or other node. In the event the payload (or data) of a packet to be sent is greater than a predetermined size (e.g., more than 256 bytes), the HCA 210 is responsible for segmenting the message or data into multiple segments for transmission in multiple cells over fabric 230. The HCA 210 also performs reassembly of multiple received cells corresponding to the same packet or message.

Similarly, I/O unit 240 includes an I/O unit module driver 540, a target channel adapter (TCA) 242 and a LAN NIC 550. TCA 242 interfaces the I/O unit 240 to the switched fabric 230 while LAN NIC 550 interfaces the I/O unit 240 to LAN 260. The I/O unit module driver 540 interfaces the NIC 550 and the TCA 242 to I/O unit 240. The I/O unit module driver 540 includes an OS and protocol interface 542, a push-push messaging layer 544, a channel interface 546 and a LAN interface 548.

As in the host 202, the push-push messaging layer 544 provides a set of communication services to the I/O unit including configuration of channels and connections, connection management, message passing (e.g., for Send operations) and Remote Direct Memory Access (RDMA) operations (described in greater detail below), and message flow control. Push-push messaging layer 544 provides a set of services to the I/O unit 240 which abstracts the details of the work queues, descriptors and other details by which data or messages are sent or transferred over the switched fabric 230 to and from other nodes (such as to/from host 202). The host 202 and the I/O unit 240 communicate and interact through the push-push-messaging layers 524 and 544.

Channel interface 546 interfaces the I/O unit 240 (or the I/O unit module driver 540) to a target channel adapter (TCA) 242. LAN interface 548 interfaces the I/O unit 240 (or the I/O unit module driver 540) to the LAN NIC 550. TCA 242 operates similar to HCA 210, including performing segmentation and reassembly when necessary.

A. Send/Receive and RDMA Write Operations

The push-push messaging layers 524 and 544 use a push-push messaging protocol to push data to the target. A message (or messaging) protocol is a formal description of message formats and the rules that two or more entities (e.g., machines) must follow to exchange those messages. There exist multiple implementation philosophies for message protocols. These implementations determine whether an entity "pushes" or "pulls" information to/from another entity. In a Push model, an entity pushes the data to the other, i.e., it initiates data transfer and notifies the other entity that data has been written. In a Pull model, an entity pulls the data by requesting the other entity to initiate a transfer to a known location.

In the push-push messaging protocol according to an example embodiment, each entity simply pushes the data to the destination (and may notify the target or destination of the buffer used for the data). Since an entity does not have to request data, latency is significantly decreased using the push-push messaging protocol. The data or messages can be transferred between entities or nodes over the switched fabric 230 using either a message Send, or a RDMA Write. According to an embodiment, message Sends can preferably be used to exchange control messages, I/O rests, replies, etc. While the RDMA write can more advantageously be used to move or transfer larger blocks of data. The messaging protocol also provides a technique for hosts and I/O units to post buffers to the other entity (for RDMA write) and to indicate a completion of the data sent by RDMA and to inform the destination of which registered buffer was used or consumed to store the transferred data using RDMA write.

1. Send/Receive Operations

For send operations, both ends of a channel participate to exchange data synchronously. The originator (or source) of a data transfer posts to a send queue a request data structure (descriptor) describing local memory (e.g., registered buffer) containing the data to be sent. The client at the destination of the transfer posts to a receive queue a data structure (e.g., a descriptor) describing the local memory (e.g., registered buffer) at the destination where the received data is to be placed. The channel adapter (e.g., HCA) of the source wraps or encapsulates the data described by the descriptor in a cell. The cell also includes a MAC header and a CRC which are generated by the channel adapter. The MAC header may include, for example, a destination MAC address, a destination work queue pair number, a source MAC address, a source work queue pair number, a packet sequence number, a cell sequence number, a cell payload length, and possibly other fields. If the data is larger than a predetermined size (e.g., 256 bytes) the channel adapter at the source may segment the data into multiple segments, wherein each segment is sent in a separate cell.

The channel adapter (e.g., HCA) at the source then sends the cell over the wire (or over the switched fabric 230). The channel adapter at the destination receives the cell, strips off the MAC header and CRC (after validating the cell), and then stores the data in a registered (or pre-posted) buffer at the destination based on the descriptor stored in the destination receive queue pair number.

Figure 6:
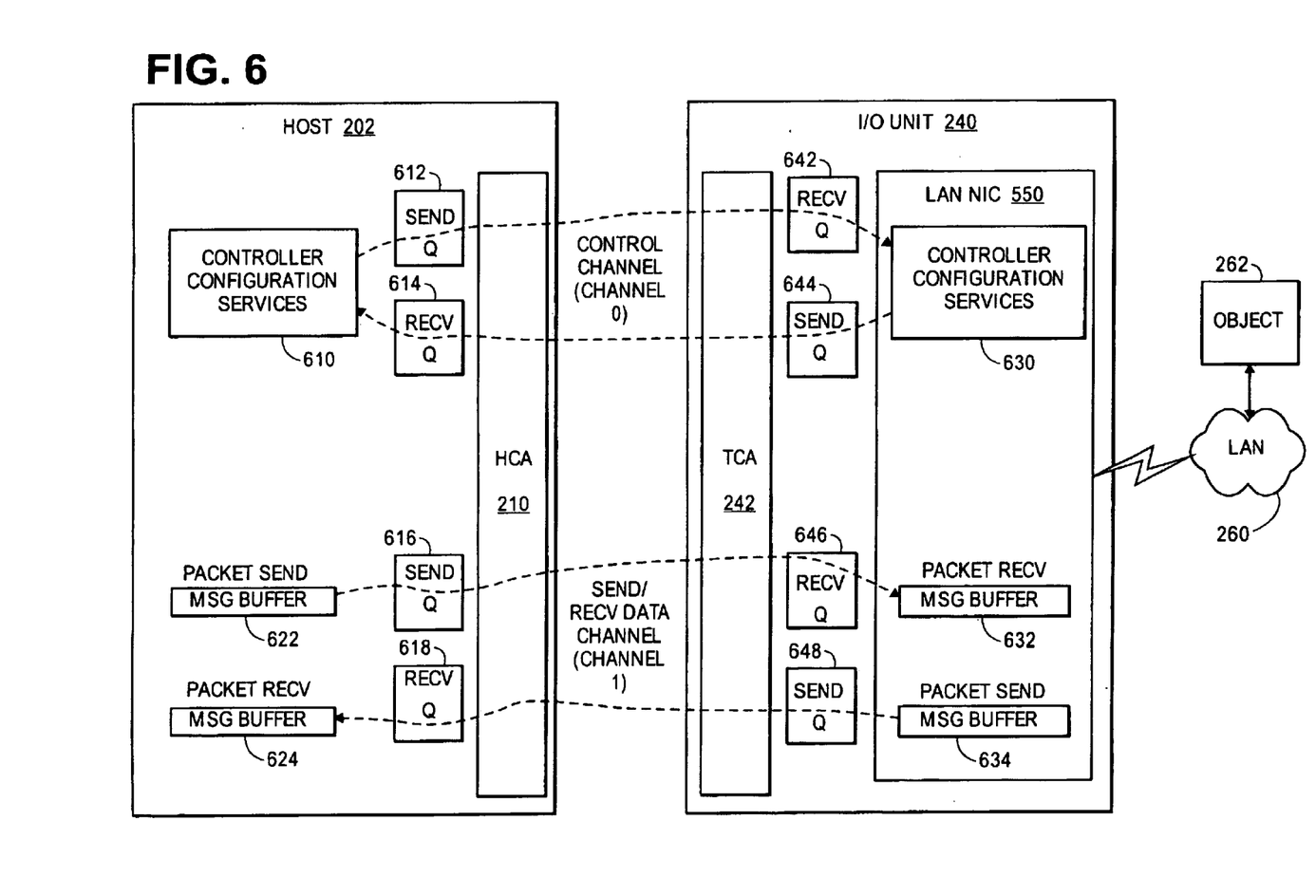
FIG. 6 is a block diagram illustrating operation of a push-push send operation according to an example embodiment.

FIG. 6 is a block diagram illustrating operation of a push-push send operation according to an example embodiment. A host 202 includes a HCA 210 and a plurality of pairs of work queues, including send queue 612 and receive queue 614 (as one pair) and send queue 616 and receive queue 618 (as another pair). A registered memory buffer 622 is shown for send operations, while a registered memory buffer 624 is shown for receive operations. Buffers 622 and 624 may reside anywhere within host 202, such as in main memory (which may be accessible by HCA 210). Controller configuration services 610 operates to send messages over switched fabric 230 to I/O unit 240 to control or configure LAN NIC 550.

I/O unit 240 (FIG. 6) includes a TCA 242 and several pairs of work queues, including a receive queue 642 and a send queue 644 (as one pair) and receive queue 646 and send queue 648 (as another pair). Controller configuration services 630 operates to receive control and configuration messages for controlling or configuring LAN NIC 550. A registered memory buffer 632 is provided for messages or data received at the I/O unit, while a registered memory buffer 634 is provided for sending data from the I/O unit 240 to the host 202. Although buffers 632 and 634 are shown as being part of LAN NIC 550, buffers 632 may reside anywhere within I/O unit 240, and for example may reside in main memory that is shared by both TCA 242 and LAN NIC 550. LAN NIC 550 interfaces I/O unit 240 to a LAN 260. An object 262 is connected to LAN 260. Although not shown, there may be one or more local I/O devices or objects connected to I/O unit 240.

According to an embodiment, two separate channels are used for communication between host 202 and I/O unit 240, including a control channel and a data channel. According to an embodiment, a connection is provided for each channel. The use of two channels may be preferable to a single channel because data transfers can occur without embedded protocol overhead.

The control channel (channel 0) is established between queues 612, 614 on the host 202 and queues 642 and 644 on the I/O unit 240. The control channel allows configuration services 610 and 630 to send each other control and configuration messages for controlling and configuring the LAN NIC 550 (e.g., to initialize LAN NIC 550 or set the MAC address of the LAN NIC 550).

As shown in FIG. 6, the send/receive data channel (channel 1) is established between queues 661, 618 of host 202 and queues 646, 648 of I/O unit 240. The data channel is provided to allow host 202 and I/O unit 240 to send and receive data (e.g., data from host 202 that is sent to I/O unit 240 which is directed to object 262, or data from object 262 that is routed through I/O unit 240 to host 202). According to an embodiment, both of these send channels are unacknowledged connected channels. As a result, no acknowledgement is required.

2. RDMA Write

Using RDMA write, a channel adapter (at the source node or originator node) performs a data transfer by remotely controlling the hardware (e.g., the DMA hardware) at the other end of the channel (at the target or destination node). Before this can happen, the originator node needs to know the address and memory handle for the memory buffer at the destination node. The destination node registers the memory buffer and then sends the address and memory handle of that registered memory buffer to the originator node (or source node). To execute a RDMA write, the originator of the transfer posts to a send queue a data structure that describes the local memory buffer containing the data to be sent or transferred and specifies the remote address where the data is to be placed at the destination and a memory handle. The memory handle provides a technique to ensure that the originator has proper authorization or access rights to access that memory buffer in the destination.

Thus, for a RDMA write, the initiator sends data to a pre-posted buffer at the destination or target. The initiator must then send the destination or target some indication of where the transferred data was stored in the destination. This indication should indicate which memory buffer or group (or pool) of memory buffers were used or consumed at the destination to store the data. The initiator can provide a transfer indication (indicating to the destination or target which buffers were used or consumed at the destination) by sending a separate message (as a Send message) to the destination after transferring the data using RDMA write. However, the initiator preferably provides a transfer indication (indicating which buffers have been consumed) by providing the transfer indication within the RDMA message itself. For example, the transfer indication may be interleaved with the data within a RDMA write message. In one embodiment, the transfer indication is provided within an immediate data field of the RDMA write message. After the application program or operating system services the data stored in the registered buffer (by moving the data into other application memory), the destination can then send a message to the initiator indicating which buffers are now free or available for use.

Figure 8:
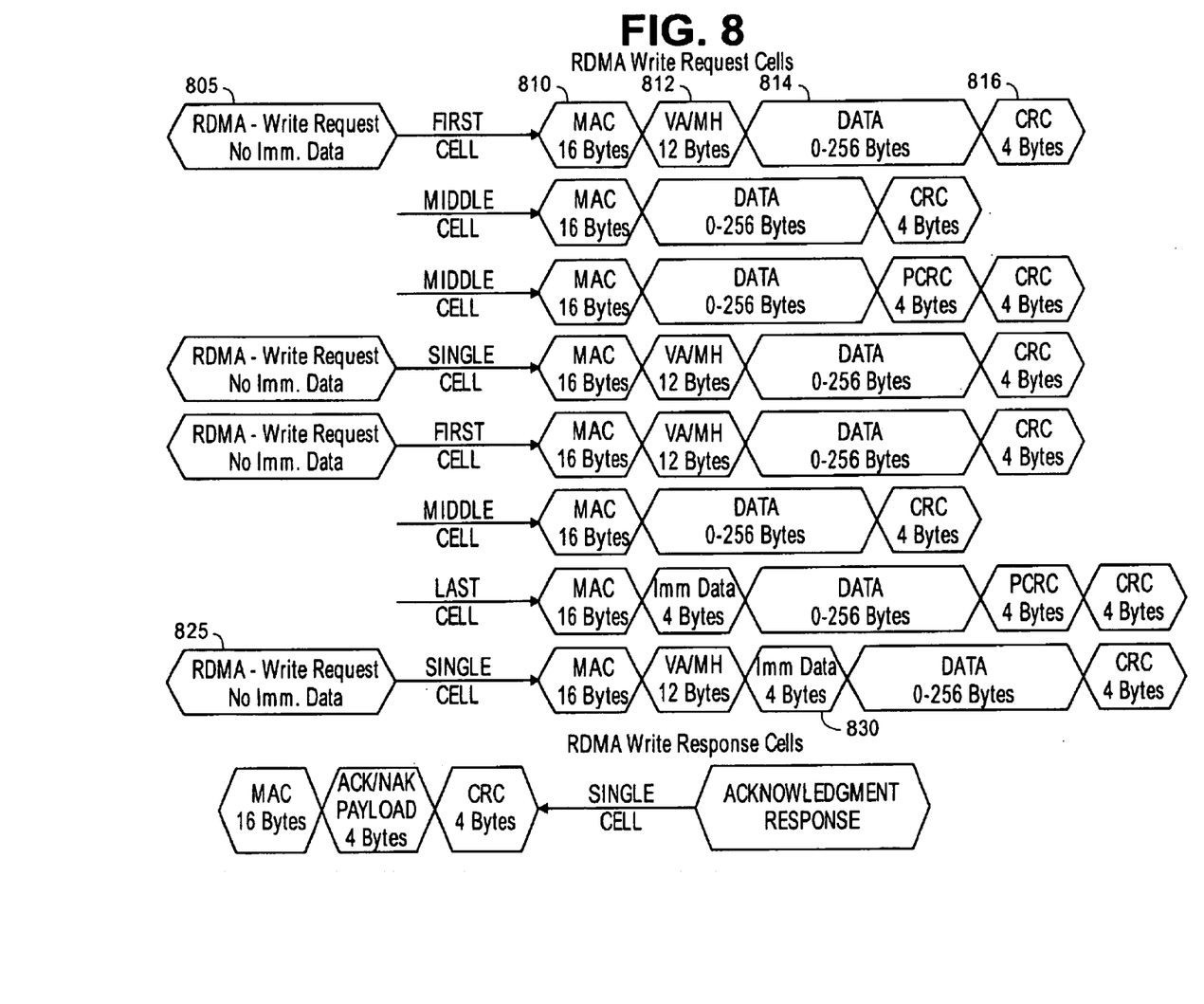
FIG. 8 is a block diagram illustrating example cell formats for a RDMA write operation according to an example embodiment.

FIG. 8 is a block diagram illustrating example cell formats for a RDMA write operation according to an example embodiment. Where no immediate data is used to provide a transfer indication, the RDMA write message 805 (request, message) includes a MAC header 810, a virtual address (VA) (identifying the address of the registered buffer at the destination which will receive the data) and memory handle (MH) 812, the data 814 and a CRC 816 (for the cell). The channel adapter will segment the data into multiple cells if the data is greater than a predetermined size (e.g., greater than 256 bytes). Middle cells do not include a VA/MH 812. A last cell may also include a packet CRC 820 (calculated across all cells for the packet). Where the transfer indication is not provide within the RDMA write message (e.g., no immediate data is used), then a separate transfer indication message (not shown) is sent from the initiator to the target or destination. RDMA write message 825 is used where the transfer indication is provided as immediate data 830.

Figure 7:
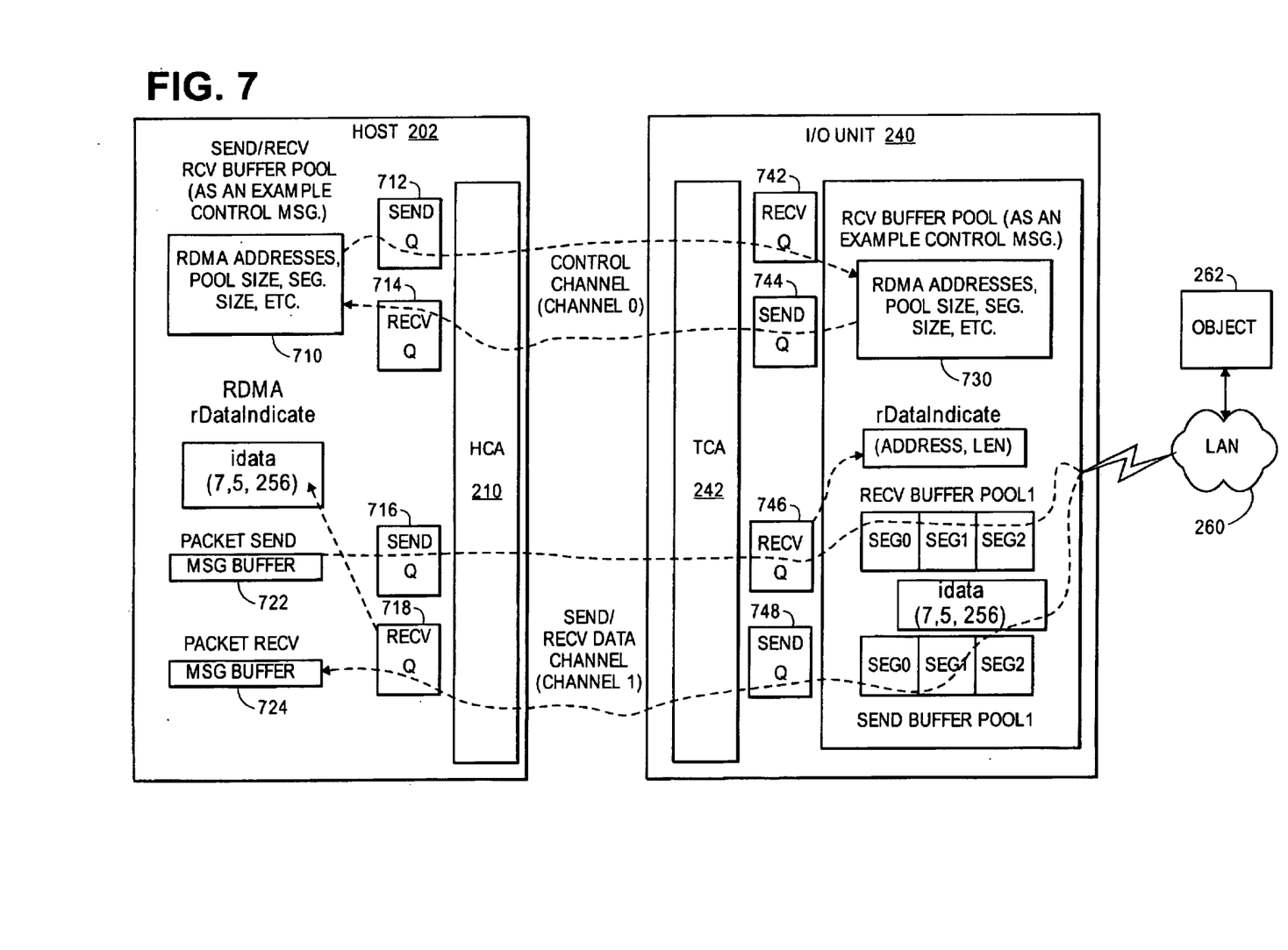
FIG. 7 is a block diagram illustrating operation of a push-push Remote DMA (RDMA) operation according to an example embodiment.

FIG. 7 is a block diagram illustrating operation of a push-push Remote DMA (RDMA) operation according to an example embodiment. Host 202 includes a HCA 210 and several pairs of work queues, including a send queue 712 and receive queue 714 (as one pair) and a send queue 716 and receive queue 718 (as another pair). As in FIG. 6, I/O unit 240 is coupled to the host 202 via the switched fabric 230 (not shown in FIG. 7). The I/O unit 240 includes a TCA 242 and several pairs of work queues including a receive queue 743 and send queue 744 (as one pair) and receive queue 746 and send queue 748 (as another pair). I/O unit 240 also includes a LAN NIC 550.

According to an example embodiment, one service connection is provided for two separate acknowledged channels, including a control channel (channel 0) and a RDMA write data channel (channel 1) for performing RDMA write operations (for transferring RDMA write messages).

A control channel (channel 0) (FIG. 7) is provided for Sending control and configuration messages between host 202 and NIC 550 (as described for FIG. 6), including messages to set the MAC address of the LAN NIC 550, etc. The control channel in FIG. 7 is also used for Sending buffer management messages that allows host 202 and I/O notify the other of which pre-posted buffers are available for use for a RDMA write, which buffers have been consumed, etc. The messages sent over the control channel are sent using Send/Receive operations or messages. Thus, for the RDMA operations, the control messages and buffer management messages are sent over one channel (a control channel) as send/receive messages, while the actual data for the RDMA write operations are sent over a separate data channel (channel 1).

An example buffer management message (BufferRcvPool) 710 (FIG. 7) is shown as being sent from the host 202 to the I/O unit 240. According to an example embodiment, the BufferRcvPool message 710 is used for host 202 to advertise to I/O unit 240 receive buffer pools at the host 202 for RDMA writes. Likewise, I/O unit 240 can send a BufferRcvPool message 730 to the host 202 to advertise receive buffer pools at the I/O unit 240 available for the host 202 to use for RDMA writes to the I/O unit 240.

Referring to FIG. 7 again, the RDMA write data channel (channel 1) will be briefly described. For inbound data (directed to the host 202) received by the LAN NIC 550 from LAN 260, the TCA 242 will segment the packet into one or more segments. As shown in FIG. 7, the transfer indication can be provided in an immediate data field (as idata) of one or more of the cells of the packet. For example, the immediate data field may indicate a pool reference (identifying a group or pool of buffers), a buffer element index (identifying a specific buffer in the pool) and the buffer element size (identifying the size of each buffer element). In the inbound data example shown in FIG. 7, an immediate data field (idata) of (7, 5, 256) is provided on one or more of the cells for the RDMA write operation that specifies pool reference 7, the $5^{th}$ element in the buffer pool, and each buffer is 256 bytes long. This is just one example embodiment, and many other formats are possible for a transfer indication. At the host 202, the idata is separated and provided to the operating system (or other program) for managing the buffers (shown as being received as rdata indicate), while the data in the cell is stored in the pre-posted registered receive buffer 724.

Similarly, outbound data can be sent from the host 202 to the I/O unit 240 using an RDMA write. Outbound data is data sent from the host 202 to the I/O unit 240 which will then typically be directed to the LAN 260, to a program running on I/O unit 240 or to a local object or I/O device connected to I/O unit 240. The data to be sent is stored in pre-posted send buffer 722. The HCA 210 segments the data if necessary, and RDMA writes the data to pre-posted receive buffers at the I/O unit 240 (e.g., receive buffer pool1), and identifies the address of the buffer pool and length of data consumed or used to store the data (e.g., within receive buffer pool 1 at I/O unit 240). According to this example embodiment, the transfer indication is provided in immediate data (idata) as a memory address (e.g., virtual address) of the memory buffer consumed and the length of data stored. This information selected or obtained from the cells by the TCA and provided to the operating system or other program at the I/O unit (shown as rdata indicate).

All message transactions take place between an initiator and a target (or destination). The target could be either a host or an I/O unit, depending on who actually owns the memory pool. Similarly the initiator could be an I/O unit or a host depending on which one is using the memory pool through RDMA writes.

It should be understood that the terms "initiator" and "target" (or destination) could be switched depending on the convention used. For example, an initiator could be a first node that requests data from a second node, advertises available receive buffers at the first node to the second node, and the second node then performs a RDMA write to the first node at the first node's request. In such case, the first node (which receives the data) might be considered an initiator, while the second node which performed the RDMA write might be considered the target. As used herein, the term initiator is used to identify the node actually performing the RDMA write, regardless of how that process began or was initiated.

B. Example Messages

The types of messages can be classified into three broad categories

Buffer Management Messages—for managing buffers, e.g. for performing RDMA write operations.

Data Transfer Messages—for actually transferring data using Sends or RDMA writes.

Control/Configuration And Utility Messages—for controlling or configuring a NIC or network device or obtaining statistics from the NIC.

1. Buffer Management Messages

These messages are used to expose the target or destination memory to the initiator, and to manage the exposed memory. The target advertises its receive memory area through a BufferRecvPool message. As part of memory advertisement, the target specifies the Number of buffer elements and size of each element. The initiator could request a new set of memory to be posted using BufferRecvPoolGet message. The initiator as part of this request specifies the number of buffer elements and size of each buffer element. The target can satisfy this request by allocating a new set of memory and exposing it through BufferRecvPool message.

BufferRecvPool Message

The target advertises its receive memory to the initiator for RDMA writes through this message. Each memory pool exposed can be considered as an array of buffer elements of fixed size. The target, as part of exposing the

| BufferRecvPool Message | | |
|---|---|---|
| 31 | | 0 |
| BufferRecvPool | Version No | |
| Pool Reference | | 4 |
| Buffer Element Count | | 8 |
| Buffer Element Size | | 12 |
| Pool Context | | 16 |
| Registered | | 20 |
| Address | | 24 |
| Pool Reference | | 36 |
| Buffer Element Count | | . |
| Buffer Element Size | | . |
| Pool Context | | . |
| Registered | | . |
| Address | | . |
| | | N |

BufferRecvPool(16) :Function name
Version No(16) :Protocol version Number
Pool Reference(32) :Index number of this exposed memory pool
BufferElement Count(32) :Number of packets on this buffer Pool
BufferElement Size(32) :Size of each packet in this buffer pool
PoolContext(64) :Context specific information for this memory pool
Registered Address(96) :Registered address of this memory pool memory, indicates to the initiator the number of buffer elements on this memory pool, the size of each element and the pool index. A context field for that memory pool is also sent along with the registered memory address. The Pool context is implementation-specific; for example, the Pool context could contain the source/destination port and source IP (Internet Protocol) address. A single message could advertise multiple buffer pools as well.

BufferRecvPoolGet

The initiator can request more receive pool memory to the target through this message. As part of this request the initiator specifies the packet size and number of packets in the requested pool. The target on receiving this message can satisfy the request by allocating a new set of memory and indicate to the initiator about the new memory pool through the BufferRecvPool message. This message as such doesn't expect a reply; however the target can respond to this message by sending the BufferRecvPool message.

| Buffer RecvPoolGet | | |
|---|---|---|
| 31 | | 0 |
| BufferRecvPoolGet | Version No | 4 |
| Pool Reference | | 8 |
| Buffer Element Count | | 12 |
| Buffer Element Size | | 16 |
| Pool Context | | 20 |
| Pool Reference | | 24 |
| Buffer Element Count | | . |
| BufferElement Size | | . |
| Pool Context | | N |

BufferRecvPoolGet(16) :Function name
Version No(16) :Protocol version Number
Pool Reference(32) :Index number of this exposed memory pool
BufferElementCount(32) :Number of packets on this buffer Pool
BufferElementsize (32) :Size of each Packet
PoolContext(64) :Context specific information for this memory pool BufferRecvPoolUpdate The buffer pool once consumed must be replenished by the target with either a new memory pool or as an update to the existing pool. The initiator uses the BufferRecvPoolUpdate message to update the existing memory pool. A is single update message can be used to update a set of memory pools. This message is used only when the registered memory Pool is to be reused for further RDMA transfer. However, to expose a new set of memory pools the initiator has to use BufferRecvPool message.

| BufferRecvPoolUpdate Message | | |
|---|---|---|
| 31 | | 0 |
| BufferRecvPoolUpdate | Version No | 4 |
| Pool Reference | | 8 |
| Buffer Element Index | | 12 |
| Pool Reference | | . |
| Buffer Element Index | | N |

BufferRecvPoolUpdate(16) :Function name
Version No(16) :Protocol version Number
Pool Reference(32) :Index number of the memory pool that has been updated
BufferElementIndex(32) :Index of the packet on this memory pool that has been updated BufferPoolFlush Messages Whenever the initiator or target has to free the memory that has been exposed, these messages are used. Both the target (owner of the RDMA buffer pool) and the initiator (the user of the RDMA buffer pool) can send this message. Typically these messages are sent at the termination of connection. If the target sends out the BufferPoolFlushRequest message the initiator has to stop using the specified memory pool and should send a BufferPoolFlushReply message to the target. The target on receiving the reply can deregister and free the memory. If the initiator sends the BufferPoolFlushRequest message the target can send a BufferPoolFlushReply and deregister and free up the memory pool.

| BufferPoolFlush Messages | | |
|---|---|---|
| 31 | | 0 |
| BufferPoolFlushRequest | Version No | 4 |
| Transaction Context | | 8 |
| Pool Reference | | 12 |
| Pool Reference | | . |
| | | N |
| 31 | | 0 |
| BufferPoolFlushReply | Version No | 4 |
| Transaction Context | | 8 |
| | | 12 |

BufferPoolFlushRequest(16) :Function name
Version No(16) :Protocol version Number
Transaction Context(64) :Transaction specific field for this message transaction
Pool Reference(32) :Index number of the memory pool that to be freed
BufferPoolFlushReply :Function name
Version No(16) :Protocol version Number
Transaction Context(64) :Transaction specific field for this message transaction(typically same as request transaction field)

2. Data Transfer Messages

There are two types of data transfers supported by the messaging protocol, one through RDMA writes and other through message sends. For RDMA write data transfer the target has exposed its receive buffer pool through the buffer management messages described above.

Data Transfer through Message Send

The actual packet send data is copied into a SendData message frame. The data is placed in the request itself along with the size of the data. This mode of data transfer will be used if there is no separate data channel. Typically the

| SendData Message | | |
|---|---|---|
| 31 | | 0 |
| SendData | Version No | 4 |
| | Packet Size | 8 |
| | Packet Data | M |
| | Packet Size | M + 4 |
| | Packet Data | . |
| | | N |

SendData(16) :Function name
Version No(16) :Protocol version Number
PacketSize(32) :Size of the Packet data
PacketData(M) :Actual data that has to transfered maximum size of the data that can be transferred are limited by the maximum size of the message frame. For this request message no specific reply is expected. Because of the limitation of the message frame size this method of data transfer is used only for small packet data transfer.

Data Transfer through RDMA Transfer

The target pre-posts the buffer pools to the initiator through the buffer management messages. The initiator pushes (Transfers) the data

| BufferRDMAIndicate Message | | |
|---|---|---|
| 31 | | 0 |
| BufferRdmaIndicate | Version No | 4 |
| | Pool Reference | 8 |
| | Buffer Element Index | 12 |
| | Buffer Element Size | 16 |
| | Pool Reference | |
| | Buffer Element Index | |
| | Buffer Element Size | N |

| BufferRdmaIndicate as 32 bit Idata | | | |
|---|---|---|---|
| 31 | | | 0 |
| Pool Ref | BfrElmtIndex | | BfrElementSize |

BufferRdmaIndicate(16): Function name
Version No(16) :Protocol version Number
Pool Reference(32) :Index number of the memory pool that has been updated
BufferElementIndex(32) :Index of the packet on this memory pool that has been updated
BufferElementSize(32) :Size of the rdma'ed data on that packet
Pool Reference(6) :Index number of the memory pool that has been updated
BufferElmtIndex(8) :Index of the packet on this memory pool that has been updated
BfrElementSize(16) :Size of the rdma'ed data on that packet into the pre-posted receive buffer of the target through the RDMA write. The buffer element used at the target for data transfers are considered to be consumed by the initiator. The initiator should then send an indication to the target about the consumed buffers. This indication message can be sent either via separate BufferRDMAIndicate message or through the use of 32 bit immediate data (Idata) field of the RDMA write (of the RDMA Transfer).

According to an example embodiment, the RDMA idata message size is limited to only 32 bit. This imposes the limitation on the number of buffer pool that can be referenced and the size of the each buffer element. The idata mode of indication could be used only if the number of buffer pools and number of buffer element is limited to 256(2*8) and the size of each buffer element is limited to 64 k (216). If the indicate (transfer indication) message doesn't fit in the 32 bit iData field (buffer pool>256, buffer element size>64 k), a separate BufferRDMAIndicate message can be sent describing the consumed memory. With this message indication the buffer pool reference and buffer element size are limited to 32 bits 3. MAC Control/Configuration and Utility Messages The CfgUtil message provides a way to share the configuration information between the Host and the target. These messages are used to transfer the utility message as well. All the data associated with the MacConfig request and Utility request are placed in the request itself. The target should respond to this request message with a reply and the data associated with the reply are place in the message frame itself. The request data size field specifies the data associated with that configuration/utility request and the reply.

| CfgUtilReply Message | | |
|---|---|---|
| 31 | | 0 |
| Cfg Util Request | Version No | 4 |
| | Transaction Context | 8 |
| Req Specific Type | Request DataSize | 12 |
| | Request specific Data | 16 |
| RequestType | Request DataSize | M |
| | Request specific Data | N |
| 31 | | 0 |
| Cfg Util Reply | Version No | 4 |
| | Transaction Context | 8 |
| Rply SpecificType | Reply DataSize | 12 |
| | Reply specific Data | 16 |
| Reply type | Reply DataSize | M |
| | Reply specific Data | N |

CfgUtilRequest(16) :Function name
Version No(16) :Protocol version Number
Transaction Context(64) :Transaction specific field for this message transaction
ReqSpecificType(16) :Type of the specific request
Request DataSize(16) :Size of the data associated with the request type
RequestSpecificData(M) :Actual data associated with the request
CfgUtilReply(16) :Function name
Version No(16) :Protocol version Number
Transaction Context(64) :Transaction specific field for this message transaction(typically same as request transaction field)
Reply specific Type(16) :Type of the specific reply
Reply DataSize(16) :Size of the data associated with the reply type
ReplySpecific data(M) :Actual data associated with the reply Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A split model network driver comprising:
   a host module driver provided on a host, the host connected to a switched fabric;
   an I/O unit module driver on a remote I/O unit, the I/O unit connected to the switched fabric;
   wherein both the host module driver and the I/O unit module driver include a push-push messaging layer to communicate messages across the switched fabric using message Sends and RDMA writes, the host module driver and the I/O unit module driver to initiate data transfers to each other without receiving a request to transfer; and
   wherein the push-push messaging layer communicate messages across the switched fabric using message Sends and RDMA writes, the RDMA writes including data and a transfer indication to identify a buffer consumed at a destination.

2. The split model network driver of claim 1 wherein the host and the I/O unit each includes a virtual interface (VI) work queue pair.

3. The split model network driver of claim 2 wherein the VI work queue pair comprises a send queue and a receive queue.

4. The split model network driver of claim 1 wherein the transfer indication is provided as immediate data in the RDMA write.

5. The split model network driver of claim 1 wherein the messaging layers of the host module driver and the I/O unit module driver communicate control and configuration messages over a first channel and communicate data over a second channel.

6. The split model network driver of claim 1 wherein the messaging layers of the host module driver and the I/O unit module driver communicate buffer management messages over a first channel and communicate data over a second channel.

7. An apparatus comprising:
a first virtual interface (VI) work queue pair;
a second virtual interface (VI) work queue pair;
a channel adapter coupled to the VI work queue pairs to interface the apparatus to a switched fabric;
a messaging layer to communicate buffer management messages over the switched fabric using the first work queue pair, and to communicate RDMA write messages over the switched fabric using the second VI work queue pair, one or more of the RDMA write messages including a transfer indication within the RDMA write message that identifies a buffer consumed by the RDMA write.

8. The apparatus of claim 7 wherein the apparatus comprises a host unit.

9. The apparatus of claim 7 wherein the apparatus comprises an I/O unit.

10. The apparatus of claim 7 wherein the messaging layer is a push-push-messaging layer.

11. The apparatus of claim 7 wherein the messaging layer is provided to communicate buffer management messages over a first channel using the first work queue pair, and to communicate RDMA write messages over a second channel using the second VI work queue pair.

12. The apparatus of claim 7 wherein the transfer indication is provided as immediate data in the RDMA write.

13. An apparatus comprising:
a virtual interface (VI) work queue;
a host channel adapter coupled to the VI work queue, the channel adapter to interface the host to a switched fabric;
a push-push messaging layer to communicate control and buffer management messages over a first channel and to communicate RDMA write messages over a second channel, one or more of the RDMA write messages including a transfer indication within the RDMA write message, the transfer indication identifying a buffer that is consumed at a destination by a RDMA write.

14. The apparatus of claim 13 wherein the apparatus comprises a host and the channel adapter comprises a host channel adapter.

15. The apparatus of claim 13 wherein the apparatus comprises an I/O unit and the channel adapter comprises a target channel adapter.

16. The apparatus of claim 15 wherein the apparatus further comprises a network interface controller (NIC) to interface the I/O unit to another network, the control channel being used by the messaging layer of the I/O unit to receive NIC configuration messages received across the switched fabric.

17. A host comprising:
at least one virtual interface (VI) work queue pair;
a host channel adapter coupled to the VI work queue pair, the channel adapter to interface the host to a switched fabric;
a push-push messaging layer to communicate control and buffer management messages over a first channel and to communicate RDMA write messages over a second channel, the messaging layers communicating a transfer indication message over the first channel after an RDMA write message and separate from the RDMA write message, the transfer indication message identifying a buffer that was consumed at a destination by a RDMA write.

18. A computerized method comprising:
establishing a connected channel between first and second nodes across a switched fabric by associating a work queue pair of the first node with a work queue pair of the second node;
communicating data from the first node to the second node using a push-push RDMA write to a pre-registered buffer at the second node, the RDMA write also including a transfer indication identifying the buffer that was consumed at the second node that received the data, with the RDMA write to comprise a data transfer initiated without receiving a request to transfer; and establishing a second connected channel between the first and second nodes, the second connected channel to communicate control and buffer management messages between the nodes.

19. The method of claim 18 wherein the transfer indication is provided as immediate data within the RDMA write.

20. A computer program, embodied in a tangible medium, when executed causes a computing device to:
establish a connected channel between first and second nodes across a switched fabric by associating a work queue pair of the first node with a work queue pair of the second node;
communicate data from the first node to the second node using a push-push RDMA write to a pre-registered buffer at the second node, the RDMA write also including a transfer indication identifying the buffer that was consumed at the second node that received the data, with the RDMA write to comprise a data transfer initiated without receiving a request to transfer; and establishing a second connected channel between the first and second nodes, the second connected channel to communicate control an buffer management messages between the nodes.

* * * * *